United States Patent
Byron et al.

(10) Patent No.: US 9,922,017 B2
(45) Date of Patent: Mar. 20, 2018

(54) MISALIGNED ANNOTATION PROCESSING

(71) Applicant: International Business Machines Corporation, Armonk, NY (US)

(72) Inventors: Donna K. Byron, Petersham, MA (US); Renee F. Decker, Brunswick, MD (US); Suzanne L. Estrada, Boca Raton, FL (US); Aditya S. Gaitonde, Marlborough, MA (US); Daniel M. Jamrog, Acton, MA (US); John A. Morganti, Austin, TX (US); Samir J. Patel, Billerica, MA (US); Joseph F. Zaffarano, Malden, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 112 days.

(21) Appl. No.: 15/158,891

(22) Filed: May 19, 2016

(65) Prior Publication Data
US 2017/0337167 A1    Nov. 23, 2017

(51) Int. Cl.
*G06F 17/21* (2006.01)
*G06F 17/24* (2006.01)
*G06F 17/30* (2006.01)

(52) U.S. Cl.
CPC ...... *G06F 17/241* (2013.01); *G06F 17/30011* (2013.01)

(58) Field of Classification Search
None
See application file for complete search history.

(56) References Cited

U.S. PATENT DOCUMENTS

| | | | |
|---|---|---|---|
| 6,178,431 B1 | 1/2001 | Douglas | |
| 7,218,783 B2 | 5/2007 | Bargeron et al. | |
| 7,747,943 B2 | 6/2010 | Bargeron et al. | |
| 8,015,482 B2 | 9/2011 | Simova et al. | |
| 2008/0201632 A1 | 8/2008 | Hong et al. | |
| 2016/0117316 A1* | 4/2016 | Le | G06F 7/023 704/9 |
| 2016/0171092 A1* | 6/2016 | Mueller | G06F 17/241 707/741 |

(Continued)

*Primary Examiner* — Asher D Kells
(74) *Attorney, Agent, or Firm* — Cantor Colburn LLP; William Stock (57) ABSTRACT

Aspects of processing misaligned annotations include receiving a tokenized document and offset annotation file at a processor. The tokenized document includes a source document and corresponding tokens resulting from a low-level segmentation process. Annotations from the annotation file are applied, in conjunction with tokenization rules, to the source document, and a misalignment responsive to the applying is determined. If the misalignment is caused by an offset mismatch, an offset number of characters between the position counts in the annotation file and the source document is calculated, and the position count in the annotation file is adjusted to coincide with the position count in the source document. If the misalignment is not caused by an offset mismatch, a current position count in the source document is reset to a position count of a previous location in which a most recent alignment between the annotation file and the source document was ascertained.

20 Claims, 3 Drawing Sheets

(56) References Cited

U.S. PATENT DOCUMENTS

2016/0179783 A1* 6/2016 Boguraev ........... G06F 17/2735
 704/9
2016/0308902 A1* 10/2016 Beamon ................ G06F 21/604
2016/0371253 A1* 12/2016 Boxwell ............. G06F 17/2785

* cited by examiner

MISALIGNED ANNOTATION PROCESSING

BACKGROUND

The invention relates generally to data processing, and more specifically, to processing misaligned annotations between a source file and an offset annotation file.

In-line annotations are often used in tagged files such as HTML and XML. The annotations are considered 'in-line,' as they are placed directly within the corresponding text file, and the text file (as well as the associated tags), can then be parsed and indexed for use in various applications.

Where a document or file does not contain in-line annotations or mark ups, one can use a tagger (e.g., a named entity tagger or part-of-speech tagger) to tag the document, which is then indexed. Alternatively, offset annotation techniques may be used. An offset annotation file includes annotations associated with a source file, which annotations are not 'in-line' with the source file. In particular, the source file itself is unmarked; rather, the offset annotation file contains the information that informs an analysis engine which tags are associated with which text spans, for subsequent use in indexing or other text processing.

SUMMARY

According to an embodiment a method, system, and computer program product for misaligned annotation processing is provided. A method includes receiving a tokenized document and an offset annotation file at a computer processor. The tokenized document includes a source document and corresponding tokens resulting from a low-level segmentation process. The method also includes applying annotations from the offset annotation file, in conjunction with a set of tokenization rules, to the source document, and determining an occurrence of a misalignment responsive to the applying. The misalignment indicates at least one of an annotation and associated position count in the annotation file does not coincide with a term at a corresponding position count in the source document, and the annotation file refers to a non-existent or inconsistent token in the source document. Upon determining the misalignment is caused by an offset mismatch, the method includes calculating an offset number of characters between the position counts in the annotation file and the source document, and adjusting the position count in the annotation file to coincide with the position count in the source document. Upon determining the misalignment is not caused by an offset mismatch, the method includes resetting a current position count in the source document to at least one of a position count of a previous location in which a most recent alignment between the annotation file and the source document was ascertained, and a next identified calibration annotation in the annotation file.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Embodiments described herein are directed to processing misaligned annotations between an offset annotation file and a source file, such as a text document. The processing utilizes various strategies to correct the misalignment before rendering the source file to a downstream ingestion process, such as a question/answer system.

Figure 1:
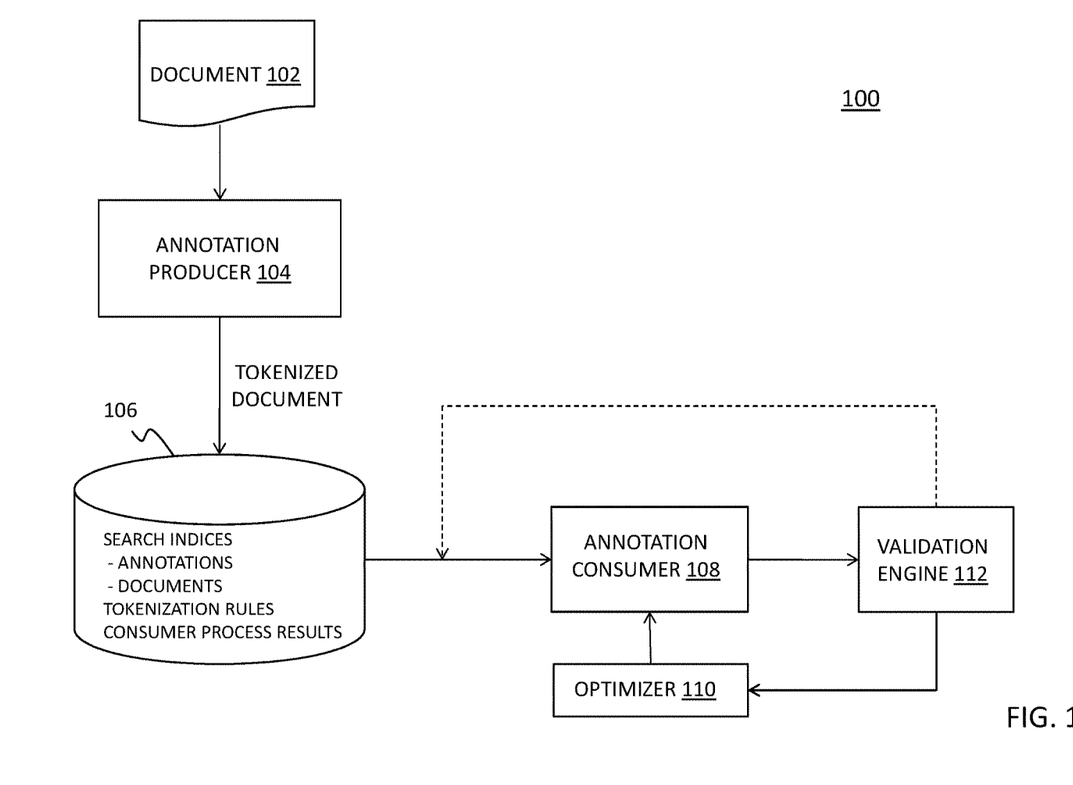
FIG. 1 depicts a block diagram of a component architecture for misaligned annotation processing in accordance with an embodiment.

Turning now to FIG. 1, a block diagram of a component architecture 100 for misaligned annotation processing will now be described in accordance with an embodiment. The misaligned annotation processing provides a number of strategies for handling misaligned annotations between a source file, and a corresponding offset annotation file. Implementation of these strategies remove the need for annotation consumers and producers to agree in advance on a single set of low-level segmentation rules, such as tokenization rules in the case where the annotation offsets are specified based on token offsets and beginning offsets.

In the component architecture 100 of FIG. 1 there is shown a document 102, which is processed by an annotation producer 104 to tokenize the document and produce an offset annotation file therefrom using a low-level segmentation process. A tokenized document refers to an unmarked source file that has been processed by an annotation producer to produce a corresponding offset annotation file that is separate from the source file. The annotation producer 104 refers to a processing unit that is configured (e.g., as a tagger) to parse documents into representative tokens (e.g., words, phrases, sentences, etc.) and tag the tokens using part-of-speech tags, named entity tags, and other semantic or syntactic inference tags.

In an embodiment, the annotation producer 104 may be implemented by a client or customer of the exemplary annotation processing provider system described herein. For example, the annotation producer 104 may be an owner of the document who contracts for document processing services offered by an entity providing the annotation processing services described herein. In this manner, having multiple different customers who provide documents for processing may employ annotation producers/taggers that comply with varying tokenization rules. For example, one producer may treat white space within a document as a character when performing a character count, which is later used in aligning annotations to corresponding text, while another producer may ignore white space in the character counts. In another example, one producer may treat a hyphenated word as two words, while another producer may treat a hyphenated word as one word. Yet other producers may count a 'period' as a character while another producer does not. These widely varying tokenization rules often present challenges for consumers of the documents that must be able to align the annotations from the annotation files, specified by character, token or other offset indexes, to the tokens in the documents.

The tokenized document and offset annotation file resulting from the annotation producer 104 may be stored in a storage device 106 as searchable indices. The document may be stored 'unmarked' by annotations, and the separate annotation file is stored along with the document. The annotation file contains the information for assisting the annotation consumer 108 in identifying the tokens in the document according to respective annotations. Thus, the source document and annotation file are received at the annotation consumer 108.

As indicated above, the annotation consumer 108 may be implemented by an entity that provides document processing services to customers. For example, the annotation consumer 108 may be implemented as a processing unit associated with a question/answer (QA) service, such as IBM's WATSON™ QA. The QA service may provide an application of advanced natural language processing, information retrieval, knowledge representation and reasoning, and machine learning technologies to the field of open domain question answering. The annotation consumer 108 reads the source file and corresponding annotation file and identifies the tokens in the source file as defined by the annotations in the annotation file. However, as indicated above, different entities that operate annotation producers using different tokenization rules can present challenges for the annotation consumer 108. In an exemplary embodiment, an optimizer 110 determines when a misalignment has occurred between the source file and the annotation file, and the optimizer 110 applies various techniques to rectify the misalignment. These techniques are described in detail in FIG. 2.

A validation engine 112, which may be implemented using a processing unit, tracks the progress of the annotation consumer 108 over time and can be configured to trigger a modification to the optimizer 110 processes under certain conditions. For example, in an embodiment, the validation engine 112 reviews the results of the annotation consumer 108 to determine a measure of accuracy. In an embodiment, the validation engine 112 performs analysis to determine, how accurate the consumer 108 was in aligning the annotations to the correct tokens. The accuracy measure can be an average percentage of correct annotations for a group of documents. In another embodiment, the accuracy measure can be an average of percentage of correct annotations over a period of time. The optimizer 110 may be configured to track this measure and trigger a review and/or modification based on the averaged percentage falling below an accuracy threshold value. For example, the optimizer 110 receives notification from the validation engine 112 when the averaged accuracy falls below 80%. When a trend indicates a falling accuracy value, this may indicate that the annotation consumer 108 may need to be adjusted (e.g., a modification of an offset value when reading characters of text).

Figure 2:
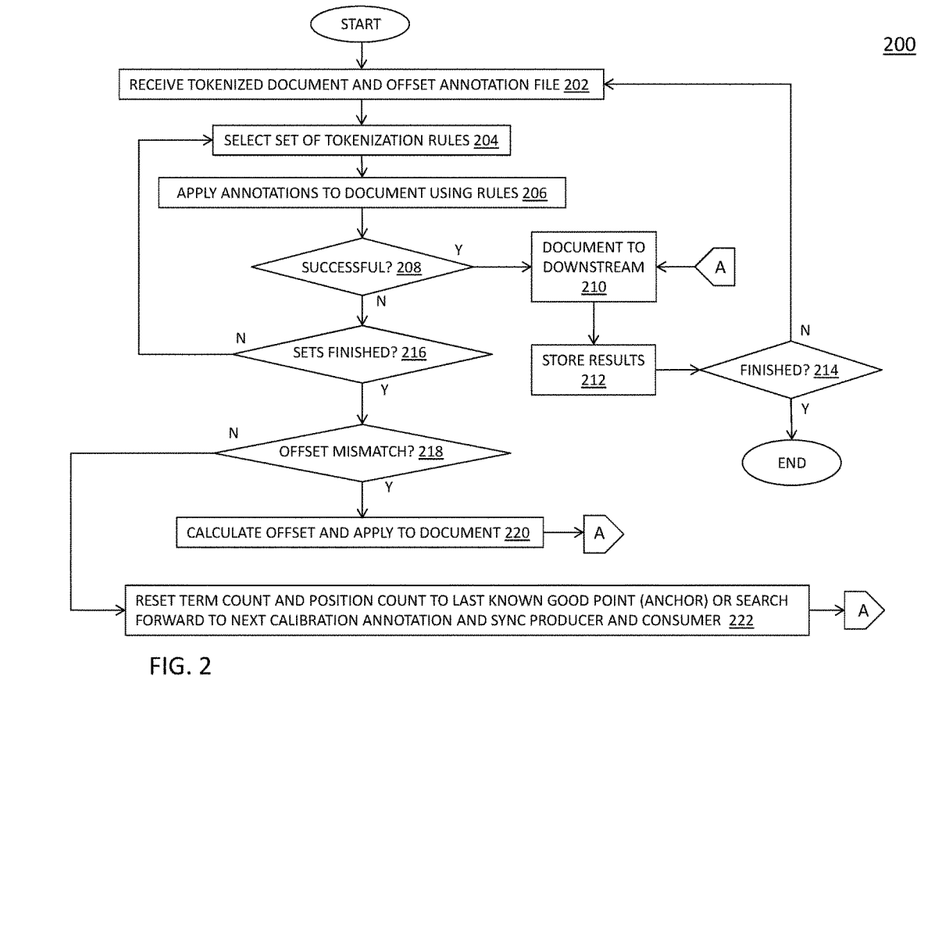
FIG. 2 depicts a flow diagram of a process for aligning misaligned annotations with a source document in accordance with an embodiment.

Turning now to FIG. 2, a flow diagram describing the misaligned annotation processes will now be described in an embodiment. The process 200 of FIG. 2 assumes that the annotation consumer 108 has begun processing a tokenized document and offset annotation file from storage device 106 to determine annotations that coincide with text units, such as tokens or sentences, in the source file. This process may include establishing a term and position count of characters that make up the source file and comparing these counts to those documented in the annotation file. An annotation in the annotation file having a position count that matches a position count in the source file, and which accurately reflects the token is considered to be in alignment.

The process 200 applies different strategies in response to a misalignment, such as applying one or more fixed sets of tokenization rules, identifying a position offset, and calibration annotation that utilizes anchor text to reset a term count during the annotation consumer processing. The anchor text may be implemented by periodically placing a calibration annotation on a currently processed and validated token during processing by the annotation consumer 108. For instance, suppose at position count 56, a corresponding annotation is determined to be in alignment based on a validation check. The process 200 places a calibration annotation at the token in position count 56, and continues processing the source file. The calibration annotation process may continue throughout the document processing. The calibration annotation may also be added by the annotation producer 104 indicating its current values for character offset, token count, etc.

The process 200 begins when the annotation consumer 108 receives a tokenized document (including a corresponding offset annotation file) at block 202. As indicated above, the annotations are not 'in-line' with the text in the source file, but are contained in a separate file and include term and position counts for respective annotations that correspond to text units, such as tokens, characters, sentences, etc., in the source file.

At block 204, a set of tokenization rules is selected from the sets of tokenization rules in storage device 106. A plurality of different sets of tokenization rules may be available for use; however, the process 200 may select or prioritize which rules and/or set of rules to apply first based on various criteria. For example, based on experience with a particular annotation producer, a particular set of tokenization rules found to be the best fit (a high degree of alignment based on historical applications) may be selected. If no prior history with a producer exists, the process may apply an ordering that prefers popularly used tokenization rules.

In block 206, the offset annotations of the annotation file are applied to the source file via the annotation consumer 108 using the selected tokenization rules. The validation engine 112 monitors the application of the offset annotations to the source file to determine whether the annotations correctly align with the tokens in the source file. In block 208, it is determined whether the application of the tokenization rules was successful (i.e., no mismatches occurred between the annotation file and the source file). If the application of the tokenization rules was successful, the annotation consumer 108 may submit the source file and annotation file to a location for further downstream processing in block 210 (e.g., indexing and/or text processing).

In block 212, the results of the processing in blocks 204-208 may be stored in the storage device 106 for processing by the validation engine 112. As indicated above, the validation engine 112 tracks the progress of the optimizer 110 over time and, based on the occurrence of specified conditions, can trigger a modification to the optimizer 110 processes. For example, the histories of stored results may be reviewed to determine how accurate the annotation consumer 108 is in aligning the annotations to the source documents.

In block 214, the annotation consumer 108 determines whether there are any other documents to be processed. If there are additional documents, the process 200 reverts to block 202. Otherwise, the process 200 ends.

Turning back to block 208, if the application of the tokenization rules to the source file was not successful (e.g., a mismatch occurred indicating a misalignment), the annotation consumer 108 determines if other tokenization rules are available for use that haven't been applied at block 216.

If so, the process 200 reverts to block 204 whereby another set of tokenization rules is selected and applied.

If, however, all sets of tokenization rules have been applied at block 216, this means that the tokenization rules are not the cause of the mismatch. In this instance, the optimizer 110 determines whether an offset mismatch has occurred at block 218. An offset mismatch can be caused by factors, such as white space between or preceding a character. If an offset mismatch has occurred, the optimizer 110 calculates the offset and the annotation consumer 108 applies the offset to the source document (e.g., increase or decrease in position count) to correct the misalignment in block 220. The source document and annotation file may be submitted to a downstream process (block 210), and the results of this step (e.g., the offset value), as well as identifying information of the annotation producer associated with the source document, is stored in the storage device 106 (block 212) for further processing by the validation engine 112.

If, however, there is no offset mismatch, but the misalignment still exists, the optimizer 110 resets the term count and position to the last known good point in block 216. The last known good point refers to an anchor point in the source file in which the term count and position were deemed to be accurate (in alignment). In an embodiment, the process 200 may place a marker at the point in which the alignment failed such that any downstream processing is informed of this point. Alternatively, the process 200 may search forward to the next calibration annotation in order to place the annotation producer 104 and the annotation consumer 108 in sync. The source file and annotation file may be submitted to a downstream process (block 210), and the results of this step (e.g., the offset value), as well as identifying information of the annotation producer 108 associated with the source file, is stored in the storage device 106 (block 212) for further processing by the validation engine 112.

Figure 3:
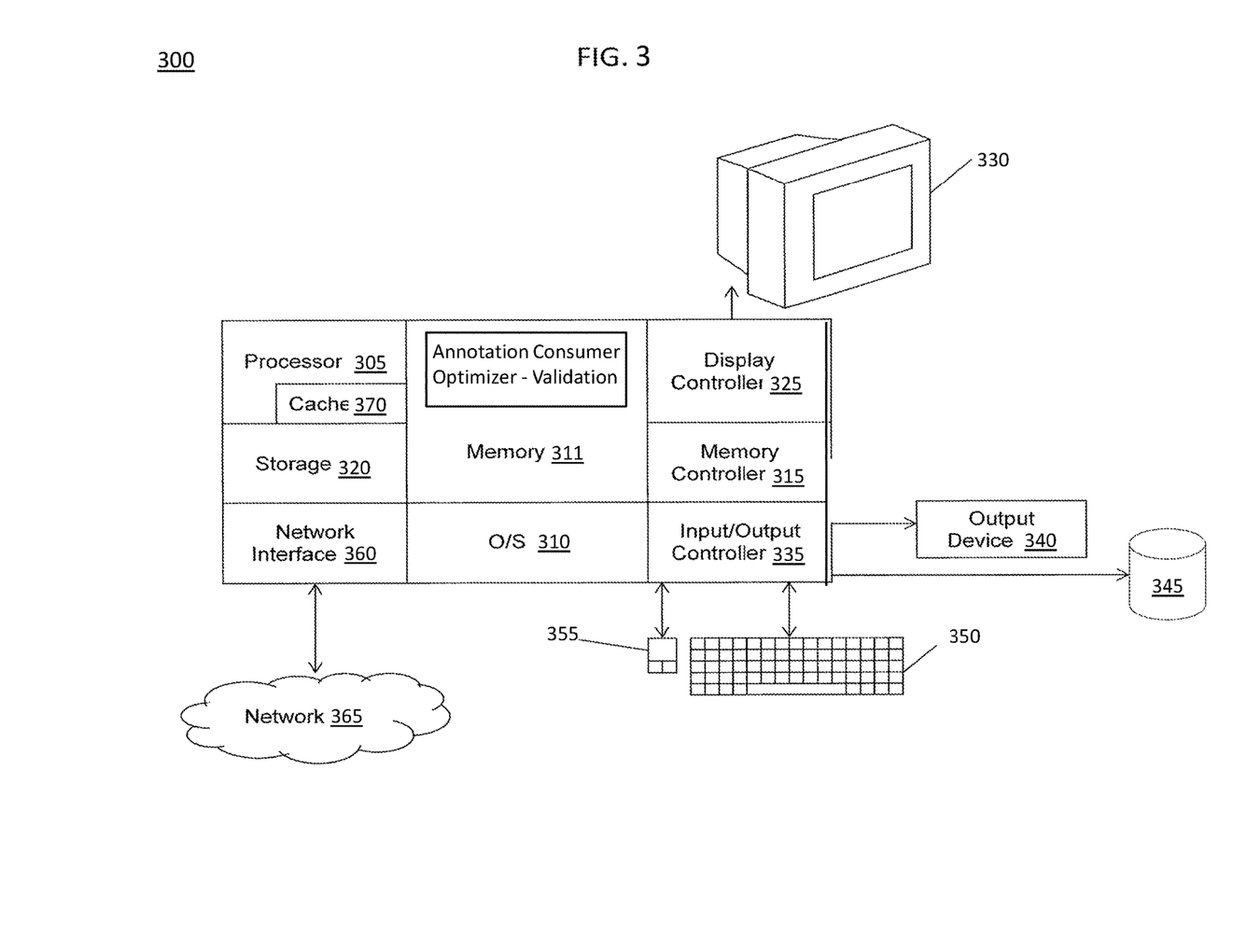
FIG. 3 depicts a system for misaligned annotation processing in accordance with an embodiment.

Turning now to FIG. 3, a block diagram of a system for implementing some or all aspects of the misaligned annotation processes is generally shown in accordance with an embodiment. FIG. 3 illustrates a block diagram of a computing device 300 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 300, such as a cellular phone, a personal digital assistant (PDA), tablet computer, personal computer, workstation, minicomputer, or mainframe computer for example.

In some embodiments, as shown in FIG. 3, the computing device 300 includes a processor 305, memory 310 coupled to a memory controller 315, and one or more input devices 345, and output devices 340, which are communicatively coupled via a local I/O controller 335. These devices 340, 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computing device 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services. The instructions in the memory also include instructions for implementing annotation consumer, optimization, and validation processes, as described herein.

Additional data, including, for example, instructions for the processor 305 or other retrievable information, may be stored in storage 320, which may be a storage device (e.g., storage device 106) such as a hard disk drive or solid state drive. The stored instructions in memory 310 or in storage 320 may include those enabling the processor to execute one or more aspects of the systems and methods of this disclosure.

The computing device 300 may further include a display controller 325 coupled to a display 330. In some embodiments, the computing device 300 may further include a network interface 360 for coupling to a network 365. The network 365 may be an IP-based network for communication between the computing device 300 and an external server, client and the like via a broadband connection. The network 365 transmits and receives data between the computing device 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 300, such as that illustrated in FIG. 3.

Technical effects and benefits include the ability to provide a number of strategies for handling misaligned annotations between a text file (document) and a corresponding offset annotation file. Implementation of these strategies removes the need for annotation consumers and producers to agree on a single set of tokenization rules.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving a tokenized document and an offset annotation file at a computer processor, the tokenized document including a source document and corresponding tokens resulting from a low-level segmentation process;
applying annotations from the offset annotation file, in conjunction with a set of tokenization rules, to the source document;
determining an occurrence of a misalignment responsive to the applying, the misalignment indicating at least one of an annotation and associated position count in the annotation file does not coincide with a term at a corresponding position count in the source document, and the annotation file indicates a non-existent or inconsistent token in the source document;
upon determining the misalignment is caused by an offset mismatch, calculating an offset number of characters between the position counts in the annotation file and the source document, and adjusting the position count in the annotation file to coincide with the position count in the source document; and
upon determining the misalignment is not caused by an offset mismatch, resetting a current position count in the source document to at least one of a position count of a previous location in which a most recent alignment between the annotation file and the source document was ascertained, and a next identified calibration annotation in the annotation file.

2. The method of claim 1, wherein the set of tokenization rules is a first set of tokenization rules applied to the tokenized document, the method further comprising iteratively selecting and applying sets of tokenization rules until all sets of the tokenization rules have been exhausted or the tokenized document is successfully completed.

3. The method of claim 1, further comprising tagging, during the applying the set of tokenization rules, a current position count in the annotation file with a calibration annotation, the calibration annotation used in determining the location of the most recent alignment.

4. The method of claim 1, wherein the calibration annotation identifies a location of a known offset, character count, and token position in the source tokenized document.

5. The method of claim 1, wherein the annotation file includes at least one of part-of-speech tags, named entity tags, syntactic inference tags, and semantic inference tags.

6. The method of claim 1, further comprising storing one or more of the sets of the tokenization rules learned from previously processed annotation files.

7. The method of claim 1, wherein the set of tokenization rules defines how elements of the tokenized document are processed, the elements including punctuation, hyphenation, and whitespace.

8. A system, comprising:
a memory having computer readable instructions; and
a processor for executing the computer readable instructions, the computer readable instructions including:
receiving a tokenized document and an offset annotation file at the processor, the tokenized document including a source document and corresponding tokens resulting from a low-level segmentation process;
applying annotations from the offset annotation file, in conjunction with a set of tokenization rules, to the source document;
determining an occurrence of a misalignment responsive to the applying, the misalignment indicating at least one of an annotation and associated position count in the annotation file does not coincide with a term at a corresponding position count in the source document, and the annotation file refers to a non-existent or inconsistent token in the source document;
upon determining the misalignment is caused by an offset mismatch, calculating an offset number of characters between the position counts in the annotation file and the source document, and adjusting the position count in the annotation file to coincide with the position count in the source document; and
upon determining the misalignment is not caused by an offset mismatch, resetting a current position count in the source document to at least one of a position count of a previous location in which a most recent alignment between the annotation file and the source document was ascertained, and a next identified calibration annotation in the annotation file.

9. The system of claim 8, wherein the set of tokenization rules is a first set of tokenization rules applied to the tokenized document, wherein the instructions further include iteratively selecting and applying sets of tokenization rules until all sets of the tokenization rules have been exhausted or the tokenized document is successfully completed.

10. The system of claim 8, wherein the instructions further include tagging, during the applying the set of tokenization rules, a current position count in the annotation file with a calibration annotation, the calibration annotation used in determining the location of the most recent alignment.

11. The system of claim 8, wherein the calibration annotation identifies a location of a known offset, character count, and token position in the source tokenized document.

12. The system of claim 8, wherein the annotation file includes at least one of part-of-speech tags and named entity tags.

13. The system of claim 8, wherein the instructions further include storing one or more of the sets of the tokenization rules learned from previously processed annotation files.

14. The system of claim 8, wherein the set of tokenization rules defines how elements of the tokenized document are processed, the elements including punctuation, hyphenation, and whitespace.

15. A computer program product comprising a computer readable storage medium having program instructions embodied therewith, the program instructions executable by a processor to cause the computer processor to perform:

receiving a tokenized document and an offset annotation file, the tokenized document including a source document and corresponding tokens resulting from a low-level segmentation process;

applying annotations from the offset annotation file, in conjunction with a set of tokenization rules, to the source document;

determining an occurrence of a misalignment responsive to the applying, the misalignment indicating at least one of an annotation and associated position count in the annotation file does not coincide with a term at a corresponding position count in the source document, and the annotation file refers to a non-existent or inconsistent token in the source document;

upon determining the misalignment is caused by an offset mismatch, calculating an offset number of characters between the position counts in the annotation file and the source document, and adjusting the position count in the annotation file to coincide with the position count in the source document; and upon determining the misalignment is not caused by an offset mismatch, resetting a current position count in the source document to at least one of a position count of a previous location in which a most recent alignment between the annotation file and the source document was ascertained, and a next identified calibration annotation in the annotation file.

16. The computer program product of claim 15, wherein the set of tokenization rules is a first set of tokenization rules applied to the tokenized document, and wherein the program instructions executable by the processor further cause the computer processor to perform:

iteratively selecting and applying sets of tokenization rules until all sets of the tokenization rules have been exhausted or the tokenized document is successfully completed.

17. The computer program product of claim 15, wherein the program instructions executable by the processor further cause the computer processor to perform:

tagging, during the applying the set of tokenization rules, a current position count in the annotation file with a calibration annotation, the calibration annotation used in determining the location of the most recent alignment.

18. The computer program product of claim 15, wherein the calibration annotation identifies a location of a known offset, character count, and token position in the source tokenized document.

19. The computer program product of claim 15, wherein the annotation file includes at least one of part-of-speech tags and named entity tags.

20. The computer program product of claim 15, wherein the program instructions executable by the processor further cause the computer processor to perform:

storing one or more of the sets of the tokenization rules learned from previously processed annotation files.

* * * * *